Dec. 21, 1965  K. J. ROED  3,224,773
TABLE BASEBALL GAME BOARD
Filed April 15, 1963  2 Sheets-Sheet 1

Fig. 1

1. LEAD RUNNER FORCED OUT
2. RUNNERS ADVANCE FROM SECOND AND THIRD AFTER FLY OUT
3. RUNNERS HOLD BASE AFTER FLY OUT
4. DOUBLE PLAY (FIRST AND SECOND)
5. GROUND OUT — RUNNERS ADVANCE ONE BASE
6. INFIELD HIT — RUNNERS ADVANCE ONE BASE ONLY
7. AFTER CATCH — RUNNER OUT ALSO ON THROW TO HOME PLATE OR THIRD

STEALING BASES
DICE THROW
(a) 2 AND 12, DOUBLE STEAL
(b) 3 THROUGH 8, RUNNER OUT AT SECOND
(c) 9 THROUGH 12, RUNNER SAFE

TO SACRIFICE BUNT
DICE THROW
(a) 4 THROUGH 11, RUNNERS ADVANCE
(b) 10, 11, 12, LEAD RUNNER OUT, BATTER ON FIRST
(c) 2, DOUBLE PLAY LEAD RUNNER, BATTER

INVENTOR.
KENNETH J. ROED
BY *Jack M. Wiviner*
ATTORNEY

Dec. 21, 1965  K. J. ROED  3,224,773
TABLE BASEBALL GAME BOARD
Filed April 15, 1963  2 Sheets-Sheet 2
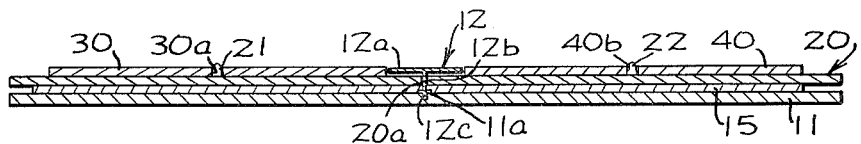
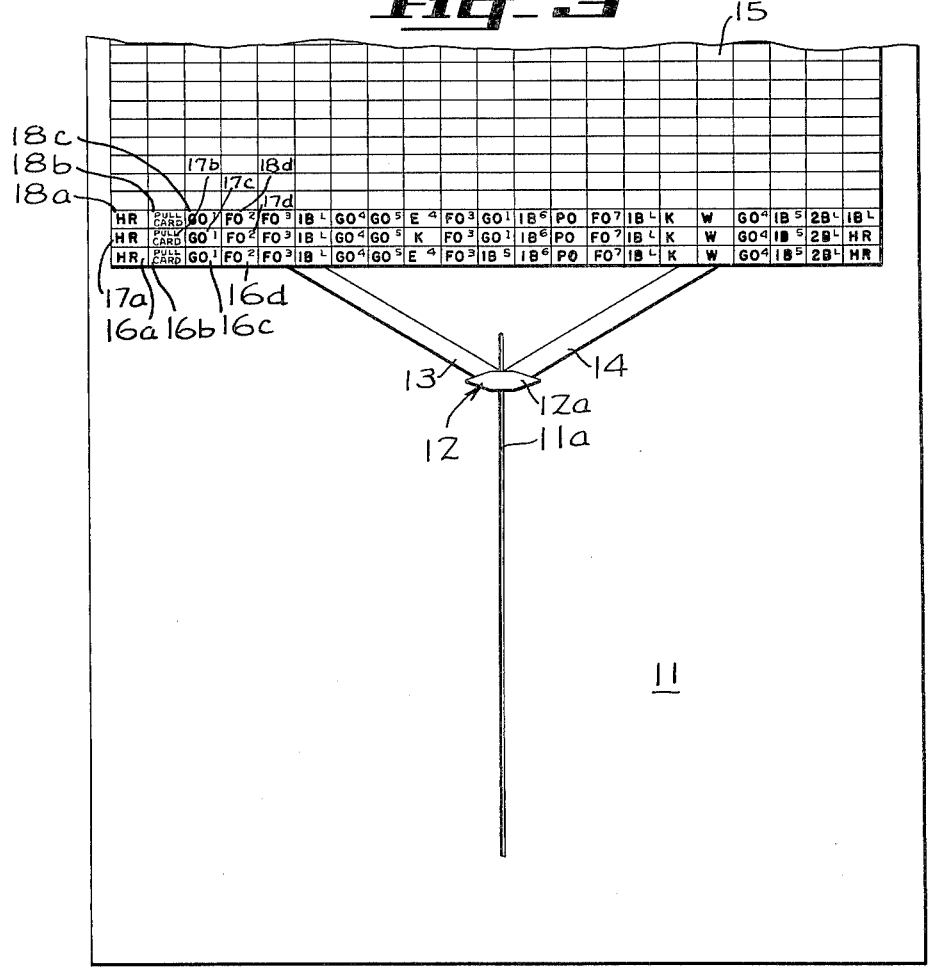
INVENTOR.
KENNETH J. ROED
BY
Jack M. Wiseman
ATTORNEY

United States Patent Office 3,224,773
Patented Dec. 21, 1965

3,224,773
TABLE BASEBALL GAME BOARD
Kenneth J. Roed, 5536 Fern Drive, San Jose, Calif.
Filed Apr. 15, 1963, Ser. No. 273,022
5 Claims. (Cl. 273—93)

The present invention relates in general to games, and more particularly to a table game closely simulating baseball.

Games relating to baseball generally depend upon factors of chance and do not correlate known statistical information to the outcome of a batting play.

Accordingly, an object of the present invention is to provide an improved baseball game.

Another object of the present invention is to provide a baseball game that correlates statistical information to the outcome of a batting play.

Another object of the present invention is to provide a baseball game that correlates the outcome of a batting play with the statistical batting average of the batter.

Another object of the present invention is to provide a baseball game that correlates the outcome of a batting play with the statistical pitching skill of a selected pitcher.

Another object of the present invention is to provide a baseball game that correlates the outcome of a batting play with the statistical batting average of the batter and with the statistical pitching skill of the selected picher.

Another object of the present invention is to provide a baseball game simulating big league baseball in many respects.

Another object of the present invention is to provide a baseball game in which judgment and skill may be exercised by players of the simulated game in a manner simulating actual baseball games.

Other and further objects and advantages will be apparent to one skilled in the art from the following description taken in conjunction with the accompanying drawings, in which:

FIG. 1 is a plan view of the baseball game of the present invention.

FIG. 2 is a vertical section taken along line 2—2 of FIG. 1.

FIG. 3 is a fragmentary plan view of the game shown in FIG. 1 with the legend sheet thereof removed.

Illustrated in FIGS. 1–3 is the game board 10 of the present invention which comprises a rigid base 11 (FIGS. 2 and 3) made of suitable material, such as cardboad or plastic and which is adaptable to rest on a supporting surface, such as a table top. Formed in the rigid base 11 is a longitudinal channel or groove 11a.

A transversely extending alignment device or alignment indicator 12 (FIGS. 1–3) is provided having a transversely extending arrow or marker 12a. Depending from the marker 12a is an upright guide member 12b (FIG. 2). A flange 12c at the lower extremity of the guide member 12b seats within the groove 11a of the base 11 and engages the upper surface of the base 11. Thus, the transversely extending alignment device 12 has a portion thereof disposed within the groove 11a to be seated thereby and is slidable longitudinally relative to the rigid base 11 by movement within the groove 11a thereof.

Attached to the alignment device 12 are outwardly extending arms 13 and 14 (FIG. 3) made of rigid, relatively thin material, such as a plastic or a metal strip. The arms 13 and 14 are fixedly secured to a slidable panel 15 (FIGS. 1–3) made of rigid, relatively thin material, such as plastic or cardboard. The lower surface of the panel 15 rests on the upper surface of the base 11 in superposed relation over a portion thereof (FIG. 3). Hence, longitudinal movement of the transversely extending alignment indicating device 12 relative to the base 11 imparts a longitudinal sliding movement to the panel 15 relative to the base 11.

Printed on the upper surface of the slidable panel 15 are the batting play outcome representations or the batting play result symbols (see FIG. 3). For this purpose, there are twenty-one rectangular boxes printed on the base 15 along each transverse line thereof, i.e. 16a–16u, 17a–17u, 18a–18u . . . . In the preferred embodiment, there are twenty-seven such transverse lines with each transverse line having twenty-one rectangular boxes formed therealong. Printed in each box will be a batting play result. Stated otherwise, the twenty-one boxes along a transverse line will have printed therein various combinations of potential hitting plays, such as a home run, one base hit, fly out, et cetera. It is to be observed and noted that the transversely aligned boxes 16a–16u will have greater batting potential results therein than the transversely aligned boxes 17a–17u. Likewise, the transversely aligned boxes 17a–17u will have greater batting potential results therein than the transversely aligned boxes 18a–18u. Therefore, the greater the distance of the transversely aligned boxes from the transversely aligned boxes 16a–16u, the lesser the batting potential results.

Superposed over the slidable panel 15 and the base 11 is a legend sheet 20 (FIGS. 1 and 2), which is fixedly secured by glue to the base 15 or otherwise caused to adhere to the base 15 along the marginal edges thereof. Formed in the legend sheet 20 is a longitudinally extending slot 20a, which receives the stem 12b of the alignment device 12. The arrow or marker 12a of the alignment device 12 is disposed above the legend sheet 20 in sliding contact with the upper surface thereof.

Also formed in the legend sheet 20 is a transversely disposed slot 20b, which is of sufficient width to permit only one row of transversely aligned rectangular boxes to be observed by a player at one time, such as transversely aligned boxes 16a–16u.

Adjacent the transversely disposed slot 20b is printed on the legend sheet 20 in transverse alignment twenty-one combinations of numbers that may appear on a conventional pair of dice when thrown. While a pair of dice is not shown herein, it is to be understood that a pair of conventional and well-known dice is employed in playing the baseball game of the present invention.

For example, if a player should roll a pair of dice and come up with two number one under the illustrated setting in FIG. 1, the batting play is a home run. In the event a player should roll a pair of disc and come up with two number six, the batting play is a one base hit. When the panel 15 is moved relative to the base 11 so that a different transverse line of boxes appears in the slot 20b of the legend sheet 20, different combinations of batting plays will result from dice number combinations.

Attached to the legend sheet 20 and projecting upwardly therefrom are laterally spaced studs or pins 21 and 22 (FIGS. 1 and 2). The pins 21 and 22 are on opposite sides of the slot 20a.

In playing the baseball game of the present invention, ten roster cards are provided, such as roster cards 30 and 40 (FIGS. 1 and 2), which are made of relatively thin plastic or cardboard.

Each roster card represents one team in a particular league, such as the American League or the National League. Printed on each roster card is a list of names for twenty-five baseball players of a particular team. Thus, there are ten teams represented by the roster cards, which teams belong to the same league, and there are twenty-five baseball players on each team.

The names of the baseball players on a particular team appear in longitudinal alignment and in the order of hitting ability of the baseball player based on the performance in batting for the previous season. Adjacent each name of the baseball players is the position played by the respective players. Hence, on the top of the card for a particular team appears the name of the baseball player with the highest batting average for the previous season. In successive sequence, taken from top to bottom, the batting average for the baseball players, taken from the performance of the last season, decreases as the names of the baseball players appear. The twenty-seven transverse lines with rectangular boxes formed therealong, which have been printed on the slidable panel 15 with batting play result symbols therein, have been calculated to provide a scale of hitting potential for each of the twenty-five baseball players on each roster card ranging from .381 percent for a power hitter (8 hits out of 21 possibilities) down to a .191 percent for a weak hitter (4 hits out of 21 possibilities).

Formed in each roster card are three apertures centrally located with respect to the card and in longitudinal alignment, such as holes 30a–30c for the roster card 30 (FIGS. 1 and 2) and openings 40a–40c for the roster card 40. At the election of a game player, the pin 21 is selectively received either by the aperture 30a, 30b or 30c. Likewise, at the election of a game player, the pin 22 is selectively received either by the aperture 40a, 40b or 40c.

Adjacent the name of its pitcher on a roster card is printed a letter description A or AA, which represents the relative pitching skill of a pitcher based on the performance of the previous season. The three most outstanding pitchers on each team will be given the AA rating. The remaining pitchers on a roster card will be given an A rating.

Printed on the legend sheet 20 in longitudinal alignment adjacent each longitudinal marginal edge thereof are the letters AA, A and B (FIG. 1). Further, printed adjacent the transverse upper edge of each roster card are arrows, such as arrows 41 for the roster card 30 and arrows 42 for the roster card 40.

The baseball game of the present invention is played with two game players. Assuming one game player selects the New York Yankees and the other game player selects the Los Angeles Angels (FIG. 1). Further, assuming that the game player selecting the New York Yankees picks initially an A rating pitcher. Therefore, the arrows 42 on the roster card 40 for the opposing team Los Angeles Angels will be aligned with A on the legend sheet 20 and the pin 22 is received by the hole 40b in the roster card 40. The game player selecting the Los Angeles Angels selected initially a pitcher with an AA rating. Accordingly, the arrows 41 on the roster card 30 for the New York Yankees is aligned with the AA printed on the legend sheet 20 and the pin 21 is received by the aperture 30a of the roster card 30.

From the foregoing, it is to be observed that the slot 20b formed in the legend sheet 20 exposes only one transverse line of combinations of batting play results at a given setting, which are printed on the slidable panel 15 (FIG. 3). As previously explained, the lowermost transverse line of boxes 16a–16u contain the best batting potential combinations. As the transversely aligned boxes containing batting play results progress from bottom to top, the combinations of batting play results contained therein decrease in batting potential. The slidable panel 15 is movable longitudinally relative to the slot 20a of the legend shet by imparting longitudinal movement to the alignment indicating device 12.

The roster cards are formed so that the batting averages for the baseball players taken from the performance of the prior season decreases as the names of the baseball players appear in succession taken from the top to the bottom. Therefore, when the alignment indicating device 12 is opposite the name of the baseball player at the top of the roster, greater batting potential combinations appear in the slot 20a. As the indicator 12 is moved toward the bottom of the roster card, lesser batting potential combinations appear in the slot 20a. Therefore, the statistical batting averages of baseball players are reflected and correlated in the batting play results of the present invention.

By adjusting the location of the roster cards longitudinally on the legend sheet 20 to reflect the pitching skill of a pitcher in the manner previously described, the batting play results in the present invention are also correlated to the statistical pitching skill of a pitcher.

Appearing at the top of the legend sheet 20 is a box 50 containing an explanation code to interpret certain numerical annotations of the hitting potential combinations printed on the sliding panel 15 and appearing in the slot 20a of the legend sheet 20. Procedures for special plays, such as stealing bases, are printed on the legend sheet 20 in a box 60. Similarly, procedures for special plays, such as a sacrifice play or a bunt, are illustrated on the legend sheet 20 in a box 70.

Twenty cards, not shown, will be included in the game of the present invention to permit rare baseball plays, such as balk, wild pitch, pass ball, et cetera. The twenty cards will be stacked in a pile and only one play will be described on each stacked card. When the pair of dice thrown by a game player comes up with numbers totaling three, then the player to determine the batting play result will pick the top card of the stacked twenty cards and read the batting play result.

In playing the baseball game of the present invention, there are two game players who function as team managers. Each game player will pick his team. Let it be assumed that one game player picked the New York Yankees and the other game player picked the Los Angeles Angels. Initially, the game player managing the Los Angeles Angels picked a pitcher with an AA rating. Therefore, the game player managing the New York Yankees aligns the arrows 41 on the New York Yankees roster card 30 with AA and places the New York Yankees roster card 30 to the left of the legend sheet 20, as viewed in FIG. 1. Under these circumstances, the pin 21 is received by the opening 30a in the New York Yankees roster card 30.

Initially, the game player managing the New York Yankees picked a pitcher with an A rating. Accordingly, the game player managing the Los Angeles Angels aligns the arrows 42 on the Los Angeles Angels roster card 40 with A and places the Los Angeles Angels roster card 40 to the right of the legend sheet 20 as viewed in FIG. 1. Hence, the pin 22 is received by the opening 40b in the Los Angeles Angels roster card 40.

Each game player is provided with a standard baseball scoring sheet, not shown, so that he may keep the team inning-by-inning score, write in a desired lineup from the roster card and arrange the batting order for the team. At this time, each game player prepares and submits on the scoring sheets the lineup and the batting order for the team he manages.

As the play begins, the game player managing the New York Yankees, which is the team first at bat, slides the alignment indicating device 12 (FIG. 1) to the name of the baseball player on the roster card 30 that is first at bat. A consequence thereof, the slidable panel 15 is moved a predetermined distance. Therefore, the batting potential combinations appearing in the slot 20a of the legend sheet will correspond to the statistical batting average of the baseball player as reflected in the actual performance for the prior season. Thus, if the baseball player had a .286 percent batting average last year by appearing midway on the roster card 30, the batting play result combinations appearing in the slot 20a will be of hitting potential combinations of .286 percent.

Now, the game player managing the New York Yankees rolls the pair of dice, not shown. The numbers on the dice that are turned up determine the outcome of the batting play by matching the resulting dice numbers with the printed dice numbers below the slot 20a to determine the resulting batting play for the first batter of the New York Yankees. This result is recorded on the scoring sheet by the game player managing the New York Yankees.

The next hitter of the New York Yankees in the prepared lineup may be a .333 percent batter and his name will appear near the top of the roster card 30. Then, the game player managing the New York Yankees moves the alignment indicating device 12 adjacent the name of the second batter on the roster card 30. Again, this action moves the slidable panel 15 and the batting play combinations, not shown, in the slot 20a have a hitting potential combination of .333 percent. Once again, the pair of dice is thrown by the game player managing the New York Yankees and the batting play result is again recorded on the scoring sheet. This action continues until three outs are made by the New York Yankees. Then, the Los Angeles Angels are at bat. The foregoing is repeated by the Los Angeles Angels until three outs are recorded for them. The first inning is over. The above is repeated for nine innings with the team having the highest score winning the game.

The rules of the game will provide on the legend sheet 20 that in the event a team gets any combination of seven hits and walks during a consecutive three inning period from one pitcher on the opposing team, then the pitcher will be considered ineffective. Therefore, the game player managing the team at bat will change the position of his team's roster card until the arrow at the top of the card is adjacent the B on the legend sheet 20 and the pin is received by the lowermost hole formed in the roster card. By moving the roster card to the B position, the hitting potential of each baseball player on the roster card is increased by two transverse rows on the slidable panel 15 to reflect combinations having improved batting result potential.

At this time, the game player managing the opposing team may substitute a relief pitcher whose rating will then control the position of the roster card for the team at bat. To discourage the use of AA rating pitchers (only three on each team) in the role as relief pitcher, the rules will provide that a pitcher may not play in the succeeding two games after pitching four or more innings in one game.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A table game for playing a baseball game comprising a gameboard a slidable panel formed with aligned rows of combinations of batting play results and slidably mounted on said gameboard to display certain of said combinations, each of said rows representing potentially different batting results, a roster card disposed adjacent said slidable panel, said roster card being formed with aligned names of baseball players, and alignment indicating means adjustably positioned relative to said roster card in the direction of name alignment and connected to said slidable panel for imparting movement to said slidable panel to correlate the position of said slidable panel with the name adjacent the alignment indicating means.

2. A table game for playing a baseball game comprising a gameboard, a slidable panel formed with aligned rows of combinations of batting play results and slidably mounted on said gameboard to display certain of said combinations, each of said rows representing potentially different batting results, said rows being arranged sequentially in the order of greater potential batting results, a roster card disposed adjacent said slidable panel, said roster card being formed with aligned names of baseball players, said names of baseball players being arranged sequentially in the order of batting performance, and alignment indicating means adjustably positioned relative to said roster card in the direction of name alignment and connected to said slidable panel for imparting movement to said slidable panel to correlate the position of one of said rows of potential batting results with the batting performance of the baseball player adjacent whose name said alignment indicating means is positioned.

3. A table game for playing a baseball game comprising a gameboard, a slidable panel formed with aligned rows of combinations of batting play results and slidably mounted on said gameboard to display certain of said combinations, each of said rows representing potentially different batting results, said rows being arranged sequentially in the order of greater potential batting results, a roster card disposed adjacent said slidable panel, said roster card being formed with aligned names of baseball players, said names of baseball players being arranged sequentially in the order of batting performance, alignment indicating means adjustably positioned relative to said roster card in the direction of name alignment and connected to said slidable panel for imparting movement to said slidable panel to correlate the position of said rows of potential batting results with the batting performance of the baseball player adjacent whose name said alignment indicating means is positioned, and means for regulating the relative position between said roster card and said slidable panel in the direction of name alignment for correlating the position of said rows of potential batting results with the pitching skill of a pitcher.

4. A table game for playing a baseball game comprising a gameboard, a slidable panel formed with aligned rows of combinations of batting play results and slidably mounted on said gameboard to display certain of said combinations, each of said rows representing potentially different batting results, said rows being arranged sequentially in the order of greater potential batting results, a legend sheet disposed above said slidable panel, said legend sheet being formed with an opening therein for exposing a row of combinations of batting play results on said slidable panel, a roster card disposed adjacent said legend sheet, said roster card being formed with aligned names of baseball players, said names of baseball players being arranged sequentially in the order of batting performance, means for regulating the distance between said roster card and said opening in said legend sheet in the direction of name alignment to represent an adjustment for the pitching skill of the pitcher, and alignment indicating means adjustably positioned relative to said roster card in the direction of name alignment and connected to said slidable panel to correlate the position of said slidable panel with the name adjacent the alignment indicating means for exposing in said opening of said legend sheet the row of combinations of potential batting play results that are correlated to the batting performance of the baseball player adjacent whose name said alignment indicating means is positioned and the pitching skill of the pitcher.

5. A table game for playing a baseball game comprising a gameboard, a movable panel formed with a sequence of combinations of batting play results representing potentially different batting results said slidably mounted on said gameboard to display certain of said combinations, a roster member disposed adjacent said movable panel, said roster member being formed with names of baseball players disposed in a sequence representing the batting performance of the baseball players, and alignment indicating means adjustably positioned relative to said roster member and connected to said movable panel for imparting movement to said movable panel for correlating the position of said movable panel with the batting performance of the baseball players.

(References on following page)

References Cited by the Examiner

UNITED STATES PATENTS

| | | | |
|---|---|---|---|
| 1,193,745 | 8/1916 | Wilson. | |
| 1,517,433 | 12/1924 | Kelly | 273—93 |
| 1,552,617 | 9/1925 | Kisor | 273—93 |
| 1,703,628 | 2/1929 | Laesch | 273—88 |
| 2,585,259 | 2/1952 | Marschke | 273—93 |

RICHARD C. PINKHAM, *Primary Examiner.*

DELBERT B. LOWE, *Examiner.*